H. P. JONES.
Kneading-Boards.

No. 144,768.     Patented Nov. 18, 1873.

WITNESSES                     INVENTOR
  G. F. Brown.                  H. P. Jones.
  H. K. Ellsworth.    By        Hill & Ellsworth,
                                  his Attorneys.

UNITED STATES PATENT OFFICE.

HARVEY P. JONES, OF DAVENPORT, IOWA.

IMPROVEMENT IN KNEADING-BOARDS.

Specification forming part of Letters Patent No. 144,768, dated November 18, 1873; application filed June 21, 1873.

*To all whom it may concern:*

Be it known that I, HARVEY P. JONES, of Davenport, in the county of Scott and State of Iowa, have invented a new and Improved Kneading-Board; and I do hereby declare the following to be a full and exact description of the same, reference being had to the accompanying drawing forming part of this description, in which—

Figure 1:
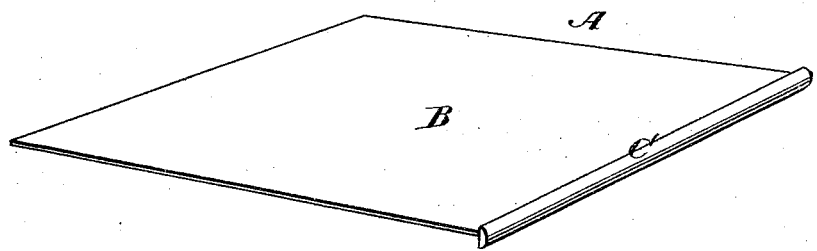
Figure 2:
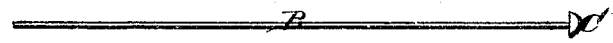

Figure 1 is a perspective view of my improved kneading-board, and Fig. 2 is an edge view of the same.

Similar letters indicate like parts in both the figures.

My invention relates to improvements in kneading-boards; and it consists in the employment of a kneading-board (which, when not in use, is slid into a groove made in a table for its reception) having a flat metallic surface for kneading purposes, terminated by a projecting ledge, the latter serving, when in use and placed on a table, to maintain the kneading-board in position, and prevent it from moving about on the table from side to side during the kneading process; the ledge also serving to keep the board square on the table, and to act as a stop when inserted in a groove in the table, and also as a handle to withdraw the board from the groove when it is desired to use it.

In the accompanying drawings, A is the kneading-board, the part B of which is made of metal to present a smoother surface for kneading purposes than when made of wood, requiring less labor on the part of the operator, and rendering it less liable to be caked with dough, and requiring less cleaning. In cleaning the board also, as is usual, with a knife, all liability to splinter is removed, the ends of which are liable to adhere to the wooden board, and afterward are liable to be incorporated in the dough. C is a ledge extending along one end of the board, and projecting above and below it.

The objects of the ledge are as follows: It maintains and steadies the board on the table during the kneading process, particularly when the dough is near the end of the board. The ledge also maintains the board square with the table, which is the most convenient position for the operator, and it likewise serves as a stop when the kneading-board is inserted in a groove in the table and not in use, and also a handle by means of which it may be drawn from the groove for kneading purposes.

Having thus fully described my invention, what I claim as new, and desire to secure by Letters Patent, is—

As a new article of manufacture, a metallic kneading-board, A, provided with a ledge, C, as set forth, and for the purposes described.

HARVEY P. JONES.

Witnesses:
JULIUS SCHUTT,
H. C. WALES.